Dec. 23, 1952 L. D. HANSEN ET AL 2,623,100
APPARATUS FOR TESTING INSULATION
Filed Oct. 12, 1949 5 Sheets-Sheet 3

FIG.3

INVENTORS
L.D. HANSEN
D.E. OVERMYER
BY
W.C. Parnell
ATTORNEY

Dec. 23, 1952     L. D. HANSEN ET AL     2,623,100

APPARATUS FOR TESTING INSULATION

Filed Oct. 12, 1949     5 Sheets-Sheet 4

INVENTORS
L. D. HANSEN
D. E. OVERMYER
BY *W. C. Parnell*
ATTORNEY

Patented Dec. 23, 1952

2,623,100

UNITED STATES PATENT OFFICE 2,623,100

APPARATUS FOR TESTING INSULATION

Lloyd D. Hansen, Fanwood, and Dwight E. Overmyer, Plainfield, N. J., assignors to Western Electric Company, Incorporated, New York, N. Y., a corporation of New York Application October 12, 1949, Serial No. 120,912

9 Claims. (Cl. 175—183)

This invention relates to the testing of materials and more particularly to the testing of insulating materials for the detection of cracks therein.

In the manufacture of jacks and lamp mountings used in telephone switchboards and similar equipment, the mounting strips of dielectric material such as hard rubber which provide the insulation between jacks or lamp sockets are usually gang drilled during the manufacturing process to receive the sleeves of the individual jacks, or the sockets of the lamps. Since the width of each strip is made as small as practicable in order to permit the maximum number of jacks or lamp sockets to be installed in the switchboard, the wall thickness of the bores is necessarily quite thin. Experience has shown that a certain percentage of these mounting strips develop cracks in the drilling operation, and it is necessary that these cracks be detected and the parts discarded before they become assembled into complete mountings.

The detection of these cracks in insulating mountings has heretofore been done visually. Since the insulating material frequently cracks in such a manner as to leave no visual indication, it has often been necessary to flex the mountings in the test in order to expose cracks of this type. This process does not necessarily disclose all of the small or incipient cracks, and in addition, flexing of the mountings in this type of testing results in the breaking of a certain percentage of satisfactory mountings in the flexing operation.

It is therefore an object of this invention to enable these insulating mountings to be quickly and accurately tested without the necessity for mechanical stress.

In one embodiment of the invention, applicant accomplishes this object by mounting a high frequency oscillator on a motor driven carriage and providing the oscillator with a bifurcated output electrode which straddles a row of stationary electrodes on which the mountings to be tested are positioned. A test voltage applied only while the carriage is in motion produces a spark discharge through any cracks in the mounting and blocks a normally conducting vacuum tube, thereby actuating an indicator.

Other objects and features will be apparent from the following detailed description taken in conjunction with the attached drawings in which.

Figure 4:
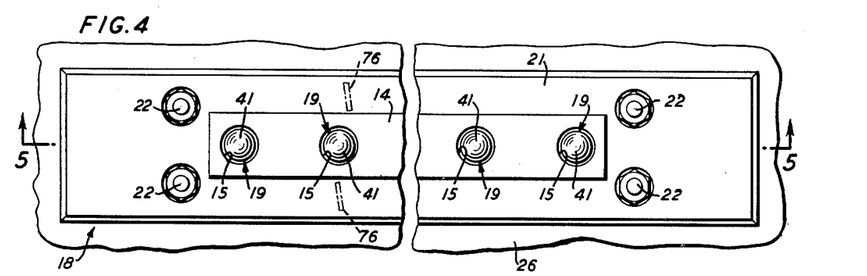
Fig. 4 is a plan view of the stationary electrode assembly on which the parts to be tested are mounted.

With reference to the drawings, the testing apparatus is mounted in a cabinet 11. The cabinet 11 has a main portion 12 and a projecting shelf-like portion 13. The insulating mountings 14 to be tested are of the type shown in Figs. 4, 5, and 6, and have a plurality of aligned bores 15. The mountings 14 are tested by means of a test fixture 18, also shown in Figs. 4, 5, and 6. This fixture comprises essentially a plurality of metallic electrodes 19 which are spaced and aligned to correspond to the bores 15 of the mounting being tested. The metallic electrodes 19 are mounted on a strip 20, this strip being rigidly connected to a platform 21 through a spacer strip 27 by means of bolts 22 and spacers 23. The electrodes 19 are positioned by both strip 20 and strip 27. The clearance holes in strip 27 are made sufficiently larger than adjacent surfaces of electrodes 19 to permit the electrodes 19 to align themselves with the corresponding bores 15 of the insulating mountings 14. The spacers 28 for electrodes 19 are slightly shorter than spacers 23 to allow the electrodes 19 the necessary horizontal positioning so the electrodes 19 will align with holes 15. The platform 21 has a flange 24 which holds the platform in place in a rectangular opening 25 of a plate 26, thus positioning the test fixture 18 in the test set.

Figure 5:
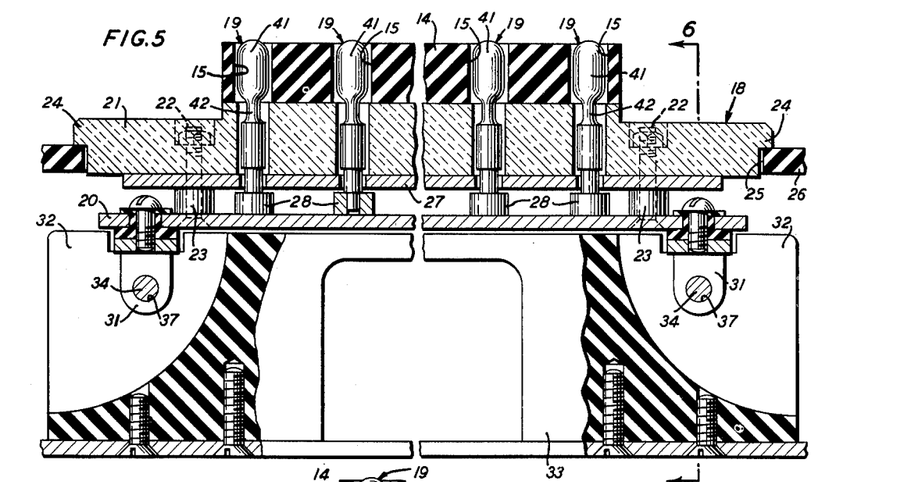
Fig. 5 is a sectional view of the stationary electrode assembly, taken along the line 5—5 of Fig. 4.
Figure 6:
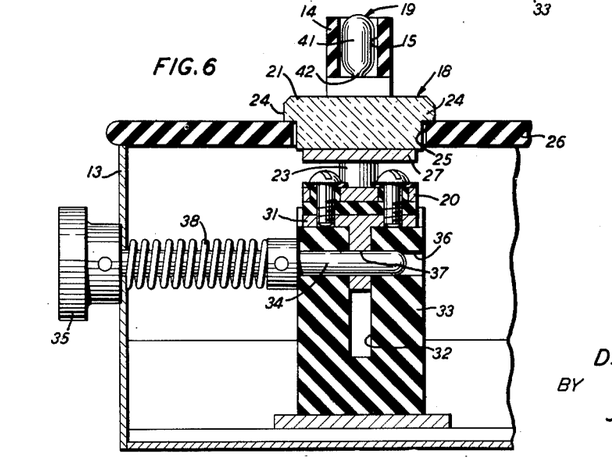
Fig. 6 is a sectional view showing how the stationary electrode assembly is locked into position, taken along the line 6—6 of Fig. 5.

Two lugs 31 are fastened to and project below the strip 20 of the test fixture 18; these lugs being used for locking the test fixture into position. The lugs are designed to fit into slots 32 of supports 33, and the test fixture is held in position by plungers 34 having knobs 35, the plungers passing through bores 36 of supports 33 and through the aligned openings 37 of the lugs 31. The test fixture may be removed from the test set by moving the knobs 35 to the left against the pressure of springs 38, which action withdraws the plungers 34 from the openings 37 of the lugs 31, allowing removal of the fixture.

The heads 41 of metallic electrodes 19 are designed to fit into the bores of the mounting 14 being tested, as shown in Fig. 5, with sufficient clearance being provided to take care of irregularities in the alignment of the mounting bores. These heads have reduced portions 42 immediately below the head to aid in the testing operation as hereafter explained.

Figure 2:
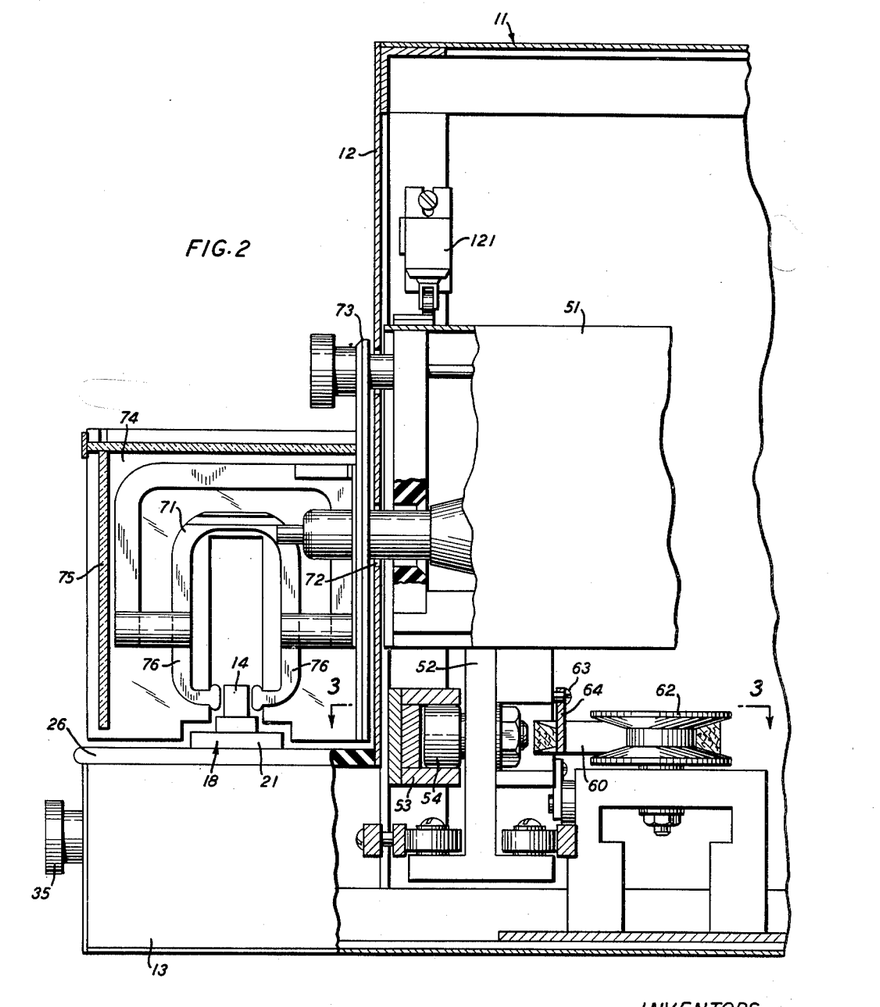
Fig. 2 is a partial sectional view, taken along the line 2—2 of Fig. 1.
Figure 3:
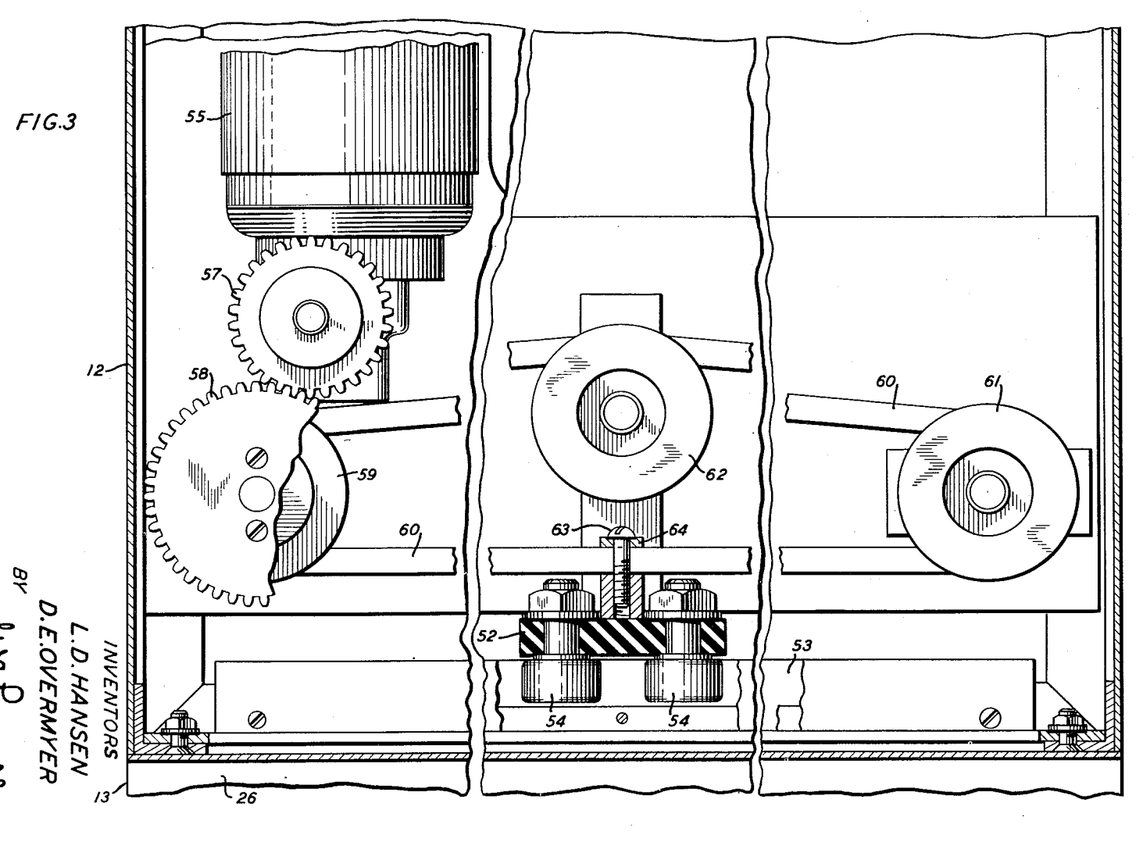
Fig. 3 is a partial sectional view taken along the line 3—3 of Fig. 2, showing the carriage driving mechanism.

Energy for the testing operation is supplied by an oscillator 51. This oscillator may be of any type which is capable of generating frequencies of about 2.5 megacycles at voltages ranging from 10,000 to 30,000 volts. The oscillator, which is mounted on a carriage 52 is movable in either direction along a runway 53 by means of rollers 54 mounted on the carriage 52. The motive power for this movement of the oscillator is supplied by a reversible motor 55, the particular type used in the present embodiment being of the capacitor start-capacitor run, single phase, alternating current type. The output shaft of the motor 55 is connected through gears 57 and 58 to a driving pulley 59. Drive belting 60, which passes around a driven pulley 61 and a takeup pulley 62, is firmly clamped to the oscillator carriage 52 by the bolt 63 and clamping strip 64. The oscillator is thus caused to move along the runway 53 when the motor is energized, with a switch 65 being used to reverse the direction of rotation of the motor and correspondingly the direction of travel of the oscillator.

Figure 1:
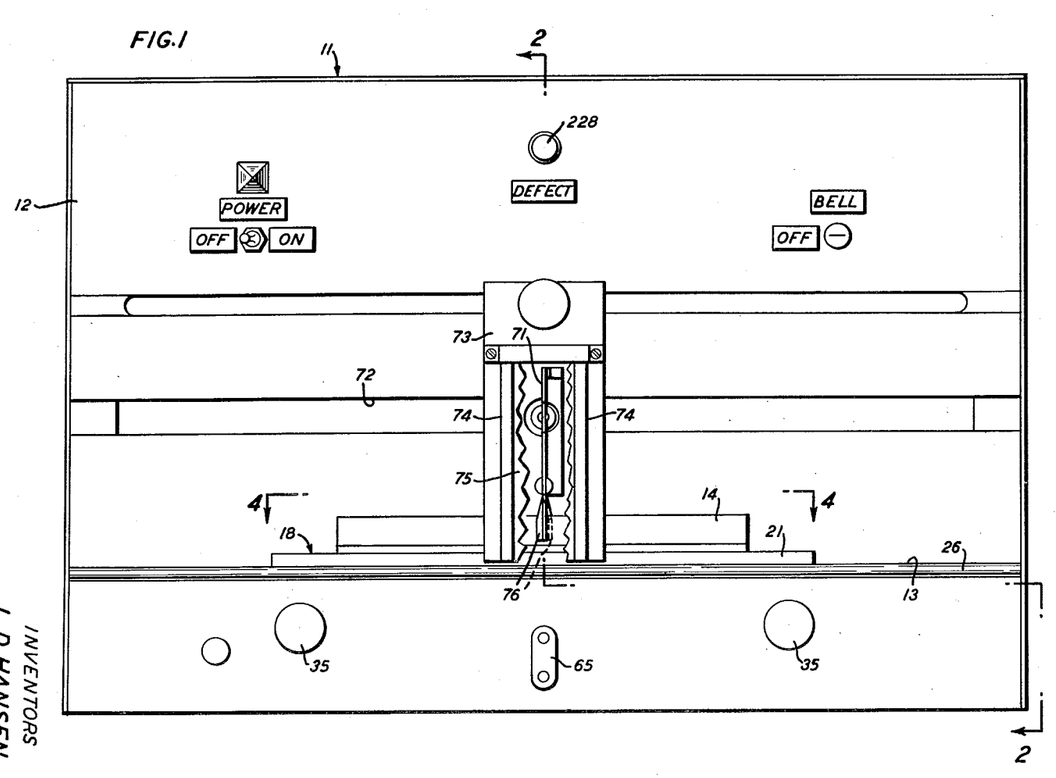
Fig. 1 is a front elevational view of the cabinet containing the testing apparatus.

The oscillator is provided with a bifurcated electrode 71 which is used to apply the oscillator output to the mounting undergoing test. This electrode projects through a longitudinal opening 72 in the cabinet 11 and is partially enclosed by a housing 73 having sides 74 of a transparent dielectric material such as methyl methacrylate. The front cover 75 should preferably be standard window glass to protect the operator from any ultraviolet rays resulting from the operation of the oscillator. The housing is rigidly connected to the main part of the oscillator through the opening 72 so that it moves with the oscillator during the travel of the latter along the runway 53. The electrode 71 is of light gauge flexible metallic material such as phosphor bronze, and is bufurcated to form prongs 76 so as to allow the testing voltage to be applied simultaneously on both sides of the test mounting to insure the detection of cracks regardless of their location in the mounting. The oscillators ordinarily used for generating such high frequencies have very high impedance and hence very low power capacity. Even mounting strips free of defects impose some load on the oscillator due to the dielectric loss in the material. When a mounting strip has a crack on each side of a bore they are usually very nearly opposite the thinnest portion of the material. If the two furcations of the electrode pass both cracks simultaneously, the two low impedance paths in parallel may result in such a large reduction in available oscillator voltage that the detector does not operate. Staggering the furcations as in Fig. 1 makes more efficient use of the oscillator power and makes the detector more reliable in operation.

Figure 7:
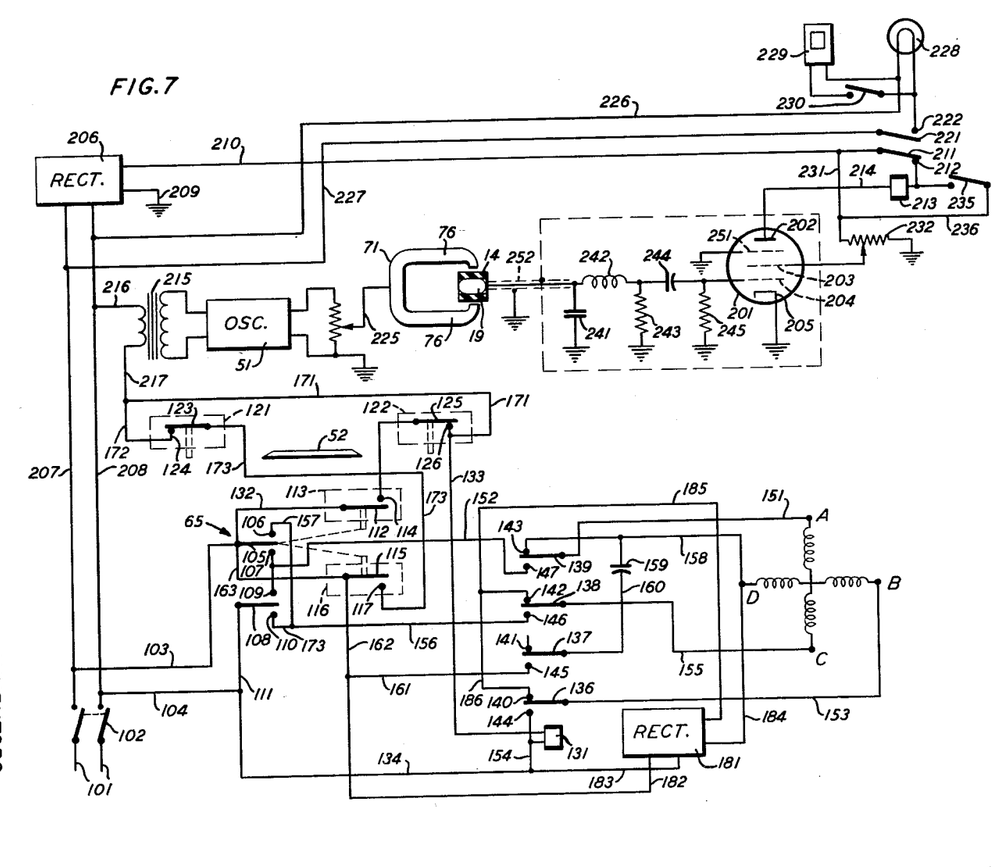
Fig. 7 is a schematic wiring diagram of the invention.

The electrical operation of the testing apparatus is shown on Fig. 7 of the drawings. With reference to the schematic wiring diagram shown in this figure, alternating current potential is supplied from a source 101, the supply line being provided with a disconnect switch 102.

Electrical power for the operation of the driving motor 55 is provided by leads 103 and 104. Reversing switch 65 is used for making and breaking the motor circuit, the switch comprising a top movable contact 105 which makes with contacts 106 and 107, and a bottom movable contact 108 which makes with contacts 109 and 110. Top movable contact 105 is connected to lead 103 as shown, while bottom movable contact 108 is connected to lead 104 through a lead 111. Contacts 105 and 108, which move in unison as the switch 65 is moved, close contact 112 of microswitch 113 against contact 114 when the former are moved so as to make with contacts 106 and 109. Similarly, contacts 105 and 108 close contact 115 of microswitch 116 against contact 117 when the former two contacts are moved so as to make against contacts 107 and 110. This is accomplished by mechanically interlocking contacts 112 and 115 of the two microswitches with contacts 105 and 108, this interlocking being arranged to insure that the contacts 105 and 108 make first and break last, thus preventing these contacts of switch 65 from interrupting the line currents of the motor circuit.

Limit switches 121 and 122 are operated by the movement of oscillator carriage 52. When the oscillator carriage is at its far left position, looking at Fig. 1, it will coact with limit switch 121 to break the contact which is normally made between contacts 123 and 124. When the oscillator carriage moves to the right away from its extreme left position, a spring return in the switch causes contacts 123 and 124 to remake. When the oscillator carriage reaches its extreme right position, it will coact with limit switch 122 to cause contact 125 to break with contact 126. This contact is similarly re-established when the carriage is disengaged from switch 122 after it has travelled a short distance to the left.

In energizing the driving motor 55, first assume that the carriage 52 is at its far left position, which means that contact 125 will be closed against contact 126. If it is desired to move the oscillator carriage to the right, switch 65 is moved to the right, which causes contacts 105 and 108 of the switch to make against contacts 106 and 109, and the movement of the switch 65 will also operate microswitch 113 to close contact 112 against contact 114. Power will now be supplied to one side of relay 131 through leads 103 and 132, contacts 112 and 114 of microswitch 113, contacts 125 and 126 of limit switch 122, and through lead 133 to the relay winding. The other side of relay 131 is connected to the power source through leads 154, 134 and 104. With the relay thus energized by the closing of switch 65, it will operate and cause relay contacts 136, 137, 138 and 139 to break with normally closed contacts 140, 141, 142 and 143 and close against make contacts 144, 145, 146, and 147.

With the relay and its contacts thus operated, power is supplied to the four terminals A, B, C, and D of the driving motor as follows:

Terminal A is now connected to the main power source through lead 151, contacts 139 and 147 of relay 131, lead 152, contacts 109 and 108 of switch 65, and leads 111 and 104.

Terminal B is supplied with power through a path extending through lead 153, contacts 136 and 144 of relay 131, and through leads 154, 134 and 104 to the source.

Terminal C is connected to the source along a path extending through lead 155, contacts 138 and 146 of relay 131, leads 156 and 157, contacts 106 and 105 of switch 65, and lead 103.

Terminal D is connected to the power source through lead 158, capacitor 159, lead 160, contacts 137 and 145 of relay 131, and leads 161, 162, 163 and 103.

From the foregoing it will be seen that the driving motor is energized to drive the oscillator carriage 52 in a given direction when the contacts of relay 131 are closed by the movement of switch 65 to one of its two operating positions. The carriage may of course be stopped at any point along its travel by moving the switch 65 to its neutral position.

When the oscillator carriage has been moved to the right a distance sufficient for the completion of the test, the carriage 52 will coact with limit switch 122 to cause contact 125 to break from contact 126 and thus open the energizing circuit for relay 131. When the relay releases, its contacts return to their normal positions, thus interrupting the power supply to the driving motor.

If it is desired to reverse the motor and move the oscillator carriage to the left, switch 65 is moved to the left, causing contacts 105 and 108 to make against contacts 107 and 110, with the movement of the switch to the left also causing contact 115 of microswitch 116 to make against contact 117. This will cause relay 131 to become energized through a circuit extending on one side through leads 154, 134, and 104, and on the other side through leads 133, 171 and 172, contacts 124 and 123 of closed limit switch 121, lead 173, contacts 117 and 115 of microswitch 116, and leads 163 and 103 to the power source.

When the movable contacts of relay 131 close against the make contacts of the relay, motor terminals B and D are supplied with power through the same circuits as described previously for the opposite direction of rotation. Terminal A will now be supplied with power through a circuit extending through lead 151, contacts 139 and 147, lead 152, contacts 107 and 105 of switch 65, and lead 103. Terminal C will now be connected to the source through lead 155, contacts 138 and 146, leads 156 and 173, contacts 110 and 108 of switch 65, and leads 111 and 104.

When the power circuits for terminals A and C are thus reversed, the direction of rotation of the driving motor will be reversed, causing the oscillator carriage 52 to be moved to the left. After completion of the test in this direction, the carriage will be stopped as before by the coaction of the carriage with limit switch 121.

As an aid in stopping the carriage quickly, provision is made for supplying direct current potential to the motor terminals as soon as the alternating current power circuit for the motor has been broken by the release of relay 131. The means for accomplishing this includes a rectifier unit 181 of a standard type, which is connected to the main A. C. supply source on one side through leads 182, 162, 163, and 103, and on the other side through leads 183, 134, and 104. When the energizing circuit of relay 131 is broken, thereby causing the movable contacts of the relay to make against the normal contacts of the relay, direct current potential is supplied to terminal A of the driving motor through leads 184, 158, contacts 143 and 139, and lead 151; to terminal B through lead 185, lead 186, contacts 140 and 136, and lead 153; to terminal C through lead 185, contacts 142 and 138, and lead 155; and to terminal D through lead 184. The application of direct current to the motor terminals as herein described will stop the motor by locking its rotor. This dynamic braking in conjunction with the mechanical advantage of the gear train associated with the motor drive, will bring the motor to a quick stop after the actuation of the limit switches.

One of the main features of the invention is the use of the output of the oscillator 51 to control the grid circuit of vacuum tube 201 and thereby indicate whether the mounting under test is satisfactory or unsatisfactory. The tube 201 includes a plate 202, a screen grid 203, a control grid 204, a suppressor grid 251, and a cathode 205, the cathode and suppressor grid being grounded. The plate voltage is supplied from a suitable rectifier 206 which is connected to the A. C. source through leads 207 and 208. On the D. C. side of the rectifier, one lead 209 is grounded while the other lead 210 is connected to the plate 202 through contacts 211 and 212 of relay 213, and through the winding of the relay 213 and lead 214. The grid circuit of the tube 201 includes all of the metallic electrodes 19 in parallel, and, as shown in Fig. 7, the bifurcated electrode 71 is so positioned with respect to the electrodes 19 that the row of metallic electrodes 19 lies approximately equidistant from the two prongs 76 during the travel of the brush assembly.

The tube 201 is a normally conducting tube, with the grid voltage normally being zero, which means that relay 213 will be energized and cause contact 211 to be made against contact 212 and contact 221 to be separated from contact 222.

The energy which passes through the electrode 71 is supplied from the oscillator 51. The input side of the oscillator is connected to the power leads 207 and 208 through a transformer 215 and leads 216 and 217.

The test mounting which is positioned in the gap between the prongs 76 and the electrodes 19 is subjected to high frequency oscillations at a voltage between 10,000 and 30,000 volts. These are damped wave trains of about 2.5 megacycles whose pattern is repeated 120 times a second. When a mounting 14 which is free from defects is placed over the metallic electrodes 19, its dielectric strength is high enough to prevent a spark from passing from the prongs 76 of the electrode 71 to any of the electrodes 19. The gap between the prongs 76 and the electrodes 19 acts in conjunction with the capacitor 241 to form in effect a capacity voltage dividing network, and when no breakdown is present the gap presents a high impedance in comparison with the capacitor 241, causing a large voltage drop across the gap, and a small voltage drop across the capacitor. The low alternating voltage across the capacitor 241 is further attenuated by a low pass filter comprising a high frequency choke 242 and a resistor 243, and a grid leak circuit including capacitor 244 and resistor 245 prevents the attenuated voltage from blocking the normal conduction of the vacuum tube.

When a mounting 14 containing a crack or similar defect is tested, the dielectric strength at the point of the defect will be reduced to a point which allows a spark to jump from nearest prong 76 of the electrode 71 to the metallic electrode 19 nearest the defect when the electrode 71 passes the defect during the travel of the oscillator carriage. The oscillator output may be varied by potentiometer 225 to set the voltage gradient between the electrode 71 and the metallic electrodes 19 at a value high enough to insure the passing of a spark between the two when a crack is present in the mounting being tested.

When a spark passes across the gap through the crack in the mounting, the gap presents a low impedance path in comparison with the capacitor 241, which causes a high alternating voltage to appear across the capacitor. On the first succeeding positive half cycle, the control grid 204 of the tube 201 is made momentarily positive with respect to the cathode 205 by virtue of the voltage now impressed across the grid circuit, and the resultant grid current flow charges capacitor 244. The charged capacitor places a negative voltage bias on the grid of the vacuum tube 201 which is sufficient to cut off or reduce the average current in the plate circuit of the vacuum tube and to a point which allows relay 213 to release. The time constant of the circuit of capacitor 244 and resistance 245 is chosen to retain this negative bias on the grid for a period long enough to allow relay 213 to become deenergized.

The release of relay 213 causes contact 211 to break from contact 212, which breaks the plate voltage circuit. This breaking of the plate voltage circuit means that the relay 213 will not reclose when the spark surge ceases and insures a positive indication for a short interval surge. At the same time, the release of relay 213 causes contact 221, which is mechanically interlocked with contact 211, to make against contact 222, and thereby close an indicating circuit which is energized through leads 226 and 227. A lamp 228, which is connected in the indicating circuit, is energized by the closing of contacts 221 and 222 to indicate the fact that the mounting under test is defective. A buzzer 229 is connected in the same circuit through a switch 230 to provide optional audible indicating means to supplement the lamp 228.

The screen grid 203, which is connected to the plate circuit through lead 231 and a variable resistor 232, is used to adjust the operation of the plate circuit to insure that the tube will conduct when a satisfactory mounting is being tested, and that the current in the plate circuit will be cut off or reduced sufficiently when a defective mounting causes a spark to pass between the electrodes 71 and 19.

After a defective mounting has been removed from the test fixture, the tube 201 is returned to its normally conducting condition by pressing a momentary contact reset button 235. This reestablishes the normal plate potential through leads 210, 231, 236, reset button 235, the winding of relay 213, and lead 214. Closure of this circuit energizes relay 213 which locks up through contacts 211 and 212.

It is desirable to place a shield 252 in the control grid circuit to render it insensitive to any influence other than the oscillator spark and to insure that the spark is not diverted from its intended path.

As a safety feature, the oscillator power supply circuit is interlocked with the motor drive circuit to cause the supply to be disconnected when the oscillator carriage is stationary at either end of its travel. This prevents the oscillator output from causing excessive dielectric heating or being otherwise a possible source of danger during such times as the oscillator is not in actual use. This is accomplished by connecting the transformer lead 217 to the main supply lead 207 through the limit switches 121 and 122 and the microswitches 113 and 116. When the oscillator carriage is in its far left position, for example, and it is desired to move it to the right, the transformer is energized through the limit switch 122, which is closed when the carriage is in this position, but the energizing circuit is not completed until contact 112 of microswitch 113 is closed against contact 114 by the moving of the switch 65 to its right position. Similarly, in moving the carriage to the left from its extreme right position, the energizing circuit for the transformer 215 passes through closed limit switch 121, but this circuit is not completed until the microswitch 116 is closed by the movement of switch 65 to the left.

It is, of course, possible to move the oscillator carriage 52 back and forth manually, thus eliminating the need for using a motor drive for this purpose. However, where the carriage is moved manually, there is danger that the oscillator voltage may cause undue dielectric heating if the carriage remains for some time in one position, which may result in the burning of a good mounting. It is therefore recommended that some type of automatic drive be used to insure a definite timed movement of the oscillator carriage from one extreme position to the other. Mounting the oscillator on the carriage with its electrode permits the use of a short lead between the oscillator and its electrode. In addition, making the test fixture stationary and moving the oscillator relative to it enables the test mountings to be loaded and unloaded in the same position.

The heads 41 of electrodes 19 are provided with reduced portions 42 immediately below the head to prevent a spark from passing directly between the electrode 71 and the electrodes 19 and bypassing the mounting under test, which might happen when a mounting free from defects has been improperly placed on the testing fixture so as to leave an air gap between the bottom of the mounting and the top of the testing fixture. By reducing the bottom part of the electrodes 19 as shown, a longer air gap is provided between the two types of electrodes, thus minimizing the chance of a spark jumping across under these conditions.

It is essential that the platform 21 be of a dielectric material which will not carbonize when subjected to heating from the oscillator power and thereby provide an alternative short circuiting path through which a spark or current could pass between the electrode 71 and the metallic electrodes 19.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for detecting cracks in insulating material specimens having a plurality of aligned bores, comprising a first electrode, a group of secondary electrodes having the same spacing and alignment as the bores and being shaped to enter the bores, a source of electrical energy, an output circuit for the source including all of the electrodes and the specimen, means for moving the electrode units relative to each other, means for adjusting the magnitude of the source output to a value sufficient to break down the dielectric resistance of a specimen containing cracks, but insufficient to break down the dielectric resistance of a specimen free from cracks, an indicating device, and means responsive to a breakdown condition of the dielectric strength of the specimen for actuating the indicating device.

2. Apparatus for testing insulating mountings having a plurality of aligned bores comprising a plurality of aligned stationary electrodes having the same spacing and alignment as the bores and being shaped to enter the bores, a carriage, an electrode mounted on the carriage, a motor for traversing the carriage between two limiting positions to move the carriage electrode along the aligned electrodes, a normally inactive oscillator connected to the electrodes, means for energizing the motor to drive the carriage selectively in either direction, a circuit for supplying power to energize the oscillator and a switch actuated in each limiting position of the carriage to stop the motor and deenergize the oscillator.

3. Apparatus for testing the dielectric strength of insulating mountings having at least one bore comprising a test fixture having at least one stationary electrode for receiving a mounting to be tested, said electrode being shaped to fit the bore, a high frequency oscillator having a discharge electrode, an energizing circuit for the oscillator, a carriage for moving the oscillator and its electrode through an arcing discharge position with respect to the stationary electrode, a motor for driving the carriage, a circuit for the motor, limit switches included in the circuits and operated by the carriage for stopping the motor at the extreme carriage positions and de-energizing the oscillator, and a circuit controlled by the limit switches for electrically braking the carriage.

4. Apparatus for testing insulating mountings comprising a cabinet having a frontal shelf and an elongate opening above the shelf, a test fixture mounted on the shelf having a plurality of aligned electrodes extending upwardly through the shelf to receive mountings to be tested, a carriage within the cabinet, a test oscillator mounted on the carriage and connected to the electrodes, means for traversing the carriage between limiting positions, an output lead for the oscillator extending through the elongate opening and terminating in an output electrode which moves parallel to and in spaced relation with the aligned electrodes, an electrical circuit including the output electrode and the aligned electrodes, and means connected in the circuit to indicate the passage of current between the electrodes, a start switch for connecting the oscillator and carriage traversing means to a source of power, and a switch actuated in each limiting position of the carriage to stop the motor and deenergize the oscillator.

5. Apparatus for detecting cracks in insulating mountings, comprising a cabinet, a test fixture mounted on the cabinet and having a plurality of aligned electrodes, an oscillator having a furcated output electrode, an output circuit for the oscillator including the fixture electrodes and the mounting to be tested, with the mounting being physically and electrically positioned between the fixture electrodes and the furcations, a carriage supporting the oscillator, driving means for the carriage for causing the oscillator to traverse the test fixture in the line of the fixture electrodes, means for energizing the oscillator to apply electrical stress across the test mounting, means for adjusting the magnitude of the oscillator output to a value sufficient to cause a current surge between the furcated electrode and a fixture electrode when the test mounting contains a crack, but insufficient to break down the dielectric resistance of the test mounting when the mounting is satisfactory, a normally conducting vacuum tube including a cathode and a control grid, with the grid connected in the oscillator output circuit and attaining a voltage sufficiently negative with respect to the cathode to block the operation of the tube on the occurrence of said current surge, and means responsive to a blocked condition of the tube for indicating a defective mounting.

6. Apparatus for detecting cracks in insulating mountings, comprising a cabinet, a test fixture mounted on the cabinet and having a plurality of aligned electrodes, an oscillator having a bifurcated output electrode, an output circuit for the oscillator including the fixture electrodes and the mounting to be tested, with the mounting physically and electrically positioned between the fixture electrodes and the furcations, a carriage supporting the oscillator, driving means for the carriage for causing the oscillator to traverse the test fixture in the line of the fixture electrodes, means for energizing the oscillator to apply electrical stress across the test mounting, means for adjusting the magnitude of the oscillator output to a value sufficient to cause a current surge between the bifurcated electrode and a fixture electrode when the test mounting contains a crack, but insufficient to break down the dielectric resistance of the test mounting when the mounting is satisfactory, means for interlocking the oscillator energizing means with the driving means to disconnect the energizing means when the carriage is stationary, a normally conducting vacuum tube including a cathode and a control grid, with the grid being connected in the oscillator output circuit and attaining a voltage sufficiently negative with respect to the cathode to block the operation of the tube on the occurrence of said current surge, and means responsive to a blocked condition of the tube for indicating a defective mounting.

7. Apparatus for detecting cracks in insulating mountings, comprising a cabinet, a test fixture mounted on the cabinet and having a plurality of aligned electrodes, an oscillator having a furcated output electrode with the furcations staggered with respect to the aligned electrodes, an output circuit for the oscillator including the fixture electrodes and the mounting to be tested, with the mounting being physically and electrically positioned between the fixture electrodes and the furcations, a carriage supporting the oscillator, driving means for the carriage for causing the oscillator to traverse the test fixture in the line of the fixture electrodes, said means being dynamically braked when the oscillator has completed its traverse, means for energizing the oscillator to apply electrical stress across the test mounting, means for adjusting the magnitude of the oscillator output to a value sufficient to cause a current surge between the bifurcated electrode and a fixture electrode when the test mounting contains a crack, but insufficient to break down the dielectric resistance of the test mounting when the mounting is satisfactory, means for interlocking the oscillator energizing means with the driving means to disconnect the energizing means when the carriage is stationary, a normally conducting vacuum tube including a cathode and a control grid, with the grid connected in the oscillator output circuit and attaining a voltage sufficiently negative with respect to the cathode to block the operation of the tube on the occurrence of said current surge, and means responsive to a blocked condition of the tube for indicating a defective mounting.

8. Apparatus for detecting cracks in insulating mountings, comprising a cabinet, a test fixture mounted on the cabinet and having a plurality of aligned electrodes, an oscillator having a bifurcated output electrode, an output circuit for the oscillator including the fixture electrodes and the mounting to be tested, with the mounting being physically and electrically positioned between the fixture electrodes and the furcations, a carriage supporting the oscillator, driving means for the carriage for causing the oscillator to traverse the test fixture in the line of the fixture electrodes, means for energizing the oscillator to apply electrical stress across the test mounting, means for adjusting the magnitude of the oscillator output to a value sufficient to cause a current surge between the bifurcated electrode and a fixture electrode when the test mounting contains a crack, but insufficient to break down the dielectric resistance of the test mounting when the mounting is satisfactory, a normally conducting vacuum tube including a cathode and a control grid, with the grid connected in the oscillator output circuit and attaining a voltage sufficiently negative with respect to the cathode to block the operation of the tube on the occurrence of said current surge, means responsive to a blocked condition of the tube for indicating a defective mounting, and means for restoring the tube to its normal condition after the cessation of the current surge.

9. Apparatus for detecting cracks in insulating mountings, comprising a cabinet, a test fixture mounted on the cabinet and having a plurality of aligned electrodes, an oscillator having an output electrode both bifurcated and staggered, an output circuit for the oscillator including the fixture electrodes and the mounting to be tested, with the mounting being physically and electrically positioned between the fixture electrodes and the furcations, a carriage supporting the oscillator, driving means for the carriage for causing the oscillator to traverse the test fixture in the line of the fixture electrodes, said means being electrically braked when the oscillator has completed its traverse, means for energizing the oscillator to apply electrical stress across the test mounting, means for adjusting the magnitude of the oscillator output to a value sufficient to cause a current surge between the bifurcated electrode and a fixture electrode when the test mounting contains a crack, but insufficient to break down the dielectric resistance of the test mounting when the mounting is satisfactory, means for interlocking the oscillator energizing means with the driving means to disconnect the energizing means when the carriage is stationary, a normally conducting vacuum tube including a cathode and a control grid, with the grid connected in the oscillator output circuit and attaining a voltage sufficiently negative with respect to the cathode to block the operation of the tube on the occurrence of said current surge, means responsive to a blocked condition of the tube for indicating a defective mounting, and means for restoring the tube to its normal condition after the cessation of the current surge.

LLOYD D. HANSEN.
DWIGHT E. OVERMYER.

REFERENCES CITED

The following references are of record in the file of this patent:

UNITED STATES PATENTS

| Number | Name | Date |
| --- | --- | --- |
| 2,195,504 | Stone | Apr. 2, 1940 |
| 2,280,119 | Gorman et al. | Apr. 21, 1942 |
| 2,304,710 | Schmidt | Dec. 8, 1942 |
| 2,436,615 | Stearns | Feb. 24, 1948 |